(12) United States Patent
Kikuichi et al.

(10) Patent No.: US 8,525,383 B2
(45) Date of Patent: Sep. 3, 2013

(54) SLIP RING DEVICE AND ROTARY ELECTRIC MACHINE USING THE SAME

(75) Inventors: Yoshihide Kikuichi, Chiyoda-ku (JP);
Kiyonori Koga, Chiyoda-ku (JP);
Sachio Tomita, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 153 days.

(21) Appl. No.: 13/320,838

(22) PCT Filed: Feb. 17, 2011

(86) PCT No.: PCT/JP2011/053368
§ 371 (c)(1),
(2), (4) Date: Nov. 16, 2011

(87) PCT Pub. No.: WO2012/111126
PCT Pub. Date: Aug. 23, 2012

(65) Prior Publication Data
US 2012/0217840 A1 Aug. 30, 2012

(51) Int. Cl.
*H01R 39/08* (2006.01)

(52) U.S. Cl.
USPC .......................... 310/232; 310/128

(58) Field of Classification Search
USPC .................. 310/128, 147, 232–233, 71
See application file for complete search history.

(56) References Cited

U.S. PATENT DOCUMENTS

| | | | | |
|---|---|---|---|---|
| 4,267,475 A * | 5/1981 | Vitchenko et al. | | 310/232 |
| 4,346,321 A * | 8/1982 | Frister | | 310/232 |
| 4,410,821 A * | 10/1983 | Kurt | | 310/227 |
| 4,535,264 A * | 8/1985 | Allport | | 310/232 |
| 5,382,856 A | 1/1995 | Keck et al. | | |
| 5,739,618 A | 4/1998 | Kleinburger et al. | | |
| 6,283,638 B1 * | 9/2001 | Feuer et al. | | 384/537 |
| 6,294,856 B1 * | 9/2001 | Ishida et al. | | 310/232 |
| 6,400,057 B2 * | 6/2002 | Vesper et al. | | 310/232 |
| 6,858,966 B2 * | 2/2005 | Kondo et al. | | 310/232 |
| 6,914,362 B2 * | 7/2005 | Lungu | | 310/219 |
| 2003/0155835 A1 * | 8/2003 | Kondo et al. | | 310/232 |

FOREIGN PATENT DOCUMENTS

| | | |
|---|---|---|
| JP | 59-176365 U | 11/1984 |
| JP | 59-216445 A | 12/1984 |
| JP | 60-032546 A | 2/1985 |
| JP | 60-109744 A | 6/1985 |

(Continued)

OTHER PUBLICATIONS

International Search Report (PCT/ISA/210) issued on May 17, 2011, by Japanese Patent Office as the International Searching Authority for International Application No. PCT/JP2011/053368.

(Continued)

*Primary Examiner* — Thanh Lam
(74) *Attorney, Agent, or Firm* — Buchanan Ingersoll & Rooney PC

(57) ABSTRACT

A first slip ring and a second slip ring are put from both ends of a slip ring shaft, respectively, and are attached by shrink-fitting, the slip ring shaft being provided separately from a rotor shaft; the shaft diameter of a lead connecting portion is formed larger than the shaft diameters of respective slip ring attaching portions; and a coupling, which is attached by shrink-fitting to a shaft end portion on the rotor shaft side of the slip ring shaft after the first slip ring is attached by shrink-fitting, is provided.

8 Claims, 9 Drawing Sheets

(56) References Cited

FOREIGN PATENT DOCUMENTS

| JP | 6-237558 A | 8/1994 |
| JP | 8-051765 A | 2/1996 |
| JP | 8-242554 A | 9/1996 |
| JP | 2003-164111 A | 6/2003 |

OTHER PUBLICATIONS

Translation of Written Opinion (PCT/ISA/237) issued on May 17, 2011, by Japanese Patent Office as the International Searching Authority for International Application No. PCT/JP2011/053368.

* cited by examiner

SLIP RING DEVICE AND ROTARY ELECTRIC MACHINE USING THE SAME

TECHNICAL FIELD

The present invention relates to a slip ring device and a rotary electric machine using the same, the slip ring device having slip rings for electrically connecting to an external device to excite a rotor of the rotary electric machine and having radial leads for flowing electricity in a radial direction of the rotor from the slip rings.

BACKGROUND ART

As a rotary electric machine using a conventional slip ring device, for example, there is one as shown in FIG. 11. A turbine generator 1 serving as a rotary electric machine includes those broadly divided into a frame 2, a stator 3, a rotor 10, and a slip ring device portion 15.

The stator 3 has a stator core 4 wound by a stator coil 6 and is fixed to an inner peripheral portion of a frame 2. The rotor 10 has magnetic poles 12 concentrically wound by a rotor coil 13 and a directly coupled portion 14. A rotational shaft 11 of the rotor 10 is removably supported by respective bearings 7a, 8a in respective brackets 7, 8 attached to the frame 2.

Slip rings 18 are insulated and held in the vicinity of a shaft end portion extended in an end portion of the outside of the machine on the side opposite to the directly coupled side of the rotational shaft 11. A current collecting portion 16 of the slip ring device portion 15 includes the slip rings 18 and brushes 19 which come in contact with the periphery of the slip rings 18. The rotor coil 13 is connected to the slip rings 18 by connection conductors (both are not shown in the drawing) disposed in grooves on the periphery of the rotational shaft 11.

The current collecting portion 16 includes the slip rings 18, the brushes 19, brush holders 20, and an insulation protective plate 21. The slip rings 18 are made of alloy steel and are fitted on insulators 17 each formed in a ring shape on the vicinity of the shaft end portion extended in the end portion of the outside of the machine on the side opposite to the directly coupled side of the rotational shaft 11.

Furthermore, FIG. 12 and FIG. 13 show specific examples of a conventional slip ring structure, which is provided with a rotor shaft end portion 52 extended from a rotor shaft 51 to outside the machine. The rotor shaft end portion 52 is formed by machining from a structure integrated with the rotor shaft 51. Then, the rotor shaft end portion 52 and the rotor shaft 51 are formed with a hollow hole 53 which is formed in their central portions to the vicinity of a coil end.

The rotor shaft end portion 52 serves as an attaching portion of the slip ring structure. The rotor shaft end portion 52 is arranged with, for example, a first slip ring 54 on the positive pole side and a second slip ring 55 on the negative pole side. The first slip ring 54 is disposed on a first slip ring attaching portion 52a on the rotor shaft 51 side; and the second slip ring 55 is disposed on a second slip ring attaching portion 52b on the side opposite to the rotor shaft 51, that is, on the shaft end side of the rotor shaft end portion 52. As described above, the first slip ring 54 on the positive pole side and the second slip ring 55 on the negative pole side are needed.

The rotor shaft end portion 52 is formed with a lead connecting portion 56 between the first slip ring 54 and the second slip ring 55. The lead connecting portion 56 is formed with a first radial lead placing hole 58 in which a first radial lead 57 is placed and a second radial lead placing hole 60 in which a second radial lead 59 is placed.

A crescent shaped first axial lead 61 to be connected to the first radial lead 57 and a crescent shaped second axial lead 62 to be connected to the second radial lead 59 are attached by insertion in the hollow hole 53 which is formed in the central portions of the rotor shaft end portion 52 and the rotor shaft 51, the hollow hole 53 being formed to the vicinity of the coil end. Then, an insulator between leads 63 is inserted between the first axial lead 61 and the second axial lead 62; and an insulator 64 is inserted between the hollow hole 53 and the first axial lead 61 and between the hollow hole 53 and the second axial lead 62. An insulator 65 is provided at end portions of the first axial lead 61 and the second axial lead 62.

The first slip ring 54 is connected to the first radial lead 57 via a first slip ring lead 66 and the second slip ring 55 is connected to the second radial lead 59 via a second slip ring lead 67.

By the way, the supply of electricity from an external portion outside the machine and the extraction of electricity from the rotor to the external portion are the flow of the electricity as shown by arrows in FIG. 12. The supply of the electricity from the external portion outside the machine flows to the first slip ring 54 on the positive pole side via the brushes (not shown in the drawing). The electricity flown to the first slip ring 54 flows to the first radial lead 57 via the first slip ring lead 66. The electricity flown to the first radial lead 57 is supplied to the rotor coil via the first axial lead 61.

The extraction of the electricity from the rotor to the external portion flows from the rotor coil to the second axial lead 62. The electricity flown to the second axial lead 62 flows to the second radial lead 59. The electricity flown to the second radial lead 59 flows to the second slip ring 55 on the negative pole side via the second slip ring lead 67. The electricity flown to the second slip ring 55 is extracted to the external portion via the brushes (not shown in the drawing).

Patent Document 1: Japanese Unexamined Patent Publication No. 2003-164111
Patent Document 2: Japanese Unexamined Patent Publication No. H6-237558
Patent Document 3: Japanese Unexamined Patent Publication No. H8-242554
Patent Document 4: Japanese Unexamined Patent Publication No. H8-51765
Patent Document 5: Japanese Unexamined Patent Publication No. S59-216445
Patent Document 6: Japanese Unexamined Patent Publication No. S60-109744
Patent Document 7: Japanese Unexamined Utility Model Publication No. S59-176365

DISCLOSURE OF THE INVENTION

Problems to be Solved by the Invention

As described above, conventionally, in the rotary electric machine, the rotor shaft 51 is provided with the bearings to support the rotor. The rotor shaft end portion 52 is extended outside the machine from a bearing portion of the rotor shaft 51. The rotor is adjusted in alignment so that a certain level of load is exerted on the bearings; and accordingly, bending stress is generated in the rotor.

Furthermore, in the case of the arrangement of a gas turbine, a generator, and a steam turbine (CGS), torsional torque due to the output of the steam turbine is loaded to the rotor shaft end portion 52 of the rotor shaft 51 on which the slip ring structure is disposed; and therefore, torsional stress is generated during operation.

The first radial lead placing hole 58 and the second radial lead placing hole 60 for the supply of the electricity to the rotor coil and the extraction of the electricity from the rotor coil are formed in the rotor shaft end portion 52 of the rotor shaft 51 on which the slip ring structure is disposed; and accordingly, such holes become sections where the stress is concentrated. Therefore, the sections of the first radial lead placing hole 58 and the second radial lead placing hole 60 tend to be the weakest sections.

In the generator of such CGS arrangement, during a fault by any chance such as a sudden short-circuit, high torsional torque is loaded to the rotor shaft end portion 52 of the rotor shaft 51 on which the slip ring structure is disposed; and therefore, generally, the rotor shaft 51 on which the rotor coil is placed and the rotor shaft end portion 52 on which the slip ring structure is disposed are manufactured in an integrated structure.

By the way, the first slip ring 54 on the positive pole side and the second slip ring 55 on the negative pole side are needed; and, the first slip ring 54 and the second slip ring 55 are attached to the rotor shaft end portion 52 in the following way, the rotor shaft end portion 52 being manufactured in the integrated structure with the rotor shaft 51.

The first slip ring 54 and the second slip ring 55 are attached by shrink-fitting to the rotor shaft end portion 52 having a slightly larger diameter than the inner diameters of the respective slip rings. The rotor shaft end portion 52 and the rotor shaft 51 are the integrated structure; and therefore, the first slip ring 54 and the second slip ring 55 need to be put from the extending shaft end side of the rotor shaft end portion 52.

First, as shown in FIG. 14, the first slip ring 54 is put from the extending shaft end side of the rotor shaft end portion 52; the first slip ring 54 is passed over the second slip ring attaching portion 52b and is further passed over the lead connecting portion 56 where the first radial lead placing hole 58 and the second radial lead placing hole 60 are formed; and the first slip ring 54 is attached to the first slip ring attaching portion 52a by shrink-fitting.

Next, the second slip ring 55 is similarly put from the extending shaft end side of the rotor shaft end portion 52 and is attached to the second slip ring attaching portion 52b by shrink-fitting. As described above, the first slip ring 54 and the second slip ring 55 are attached by shrink-fitting while sandwiching the lead connecting portion 56 where the first radial lead placing hole 58 and the second radial lead placing hole 60 are formed.

As described above, the first slip ring 54 is put from the extending shaft end side of the rotor shaft end portion and is shrink-fitted at the position beyond the lead connecting portion 56 where the first radial lead placing hole 58 and the second radial lead placing hole 60 are formed; and accordingly, much labor and time are required for its shrink-fitting work.

Furthermore, a problem exists in that the shaft diameter of the rotor shaft end portion 52 including the lead connecting portion 56 where the first radial lead placing hole 58 and the second radial lead placing hole 60 are formed cannot be larger than the shrink-fitting diameters of the first slip ring 54 and the second slip ring 55. More particularly, the lead connecting portion 56 is formed with the first radial lead placing hole 58 and the second radial lead placing hole 60; and therefore, such holes become the sections where the stress is concentrated. Therefore, the sections of the lead connecting portion 56 where the first radial lead placing hole 58 and the second radial lead placing hole 60 are formed are the weakest sections.

In addition, the diameters of the first slip ring 54 and the second slip ring 55 are restricted by the peripheral velocity of the brushes (not shown in the drawing); and therefore, the outer diameters of the first slip ring 54 and the second slip ring 55 are restricted. Then, along with that, the shaft diameter of the rotor shaft end portion 52 including the lead connecting portion 56 where the first radial lead placing hole 58 and the second radial lead placing hole 60 are formed cannot be also large; and thus, it becomes difficult to improve strength.

The present invention has been made to solve the problem described above, and an object of the present invention is to provide a slip ring device and a rotary electric machine using the same; in the slip ring device, a first slip ring and a second slip ring are put from both ends of a slip ring shaft, respectively, and are attached by shrink-fitting, the slip ring shaft being provided separately from a rotor shaft, and the shaft diameter of a lead connecting portion where a first radial lead placing hole and a second radial lead placing hole of the slip ring shaft are formed is formed larger than the shaft diameters of a first slip ring attaching portion and a second slip ring attaching portion.

Means for Solving the Problems

According to the present invention, there is provided a slip ring device including: a slip ring shaft provided separately from a rotor shaft; a first slip ring and a second slip ring, both of which being put from both ends of the slip ring shaft, respectively, the first slip ring being attached by shrink-fitting to a first slip ring attaching portion of the slip ring shaft, and the second slip ring being attached by shrink-fitting to a second slip ring attaching portion of the slip ring shaft; a lead connecting portion which is located between the first slip ring attaching portion and the second slip ring attaching portion in the slip ring shaft and is formed to be a shaft diameter larger than the shaft diameters of the first slip ring attaching portion and the second slip ring attaching portion of the slip ring shaft; a first radial lead and a second radial lead, the first radial lead being placed in a first radial lead placing hole and the second radial lead being placed in a second radial lead placing hole, the radial lead placing holes being formed in the lead connecting portion; a first axial lead and a second axial lead, both of which being placed in a hollow hole formed in a central portion of the slip ring shaft, the first axial lead being connected to the first radial lead and the second axial lead being connected to the second radial lead; a first slip ring lead which is connected to the first slip ring and to the first radial lead; a second slip ring lead which is connected to the second slip ring and to the second radial lead; and a coupling which is attached by shrink-fitting to a shaft end portion on the rotor shaft side of the slip ring shaft after the first slip ring is attached by shrink-fitting.

Advantageous Effect of the Invention

According to a slip ring device of the present invention, a first slip ring and a second slip ring are put from both ends of a slip ring shaft, respectively, and are attached by shrink-fitting, the slip ring shaft being provided separately from a rotor shaft, the shaft diameter of a lead connecting portion in which a first radial lead and a second radial lead are placed is formed larger than the shaft diameters of respective slip ring attaching portions, and a coupling which is attached by shrink-fitting to a shaft end portion on the rotor shaft side of the slip ring shaft after the first slip ring is attached by shrink-fitting is provided, whereby it becomes possible to obtain the slip ring device which can achieve that time of shrink-fitting work is shortened and strength is improved.

MODE FOR CARRYING OUT THE INVENTION

Embodiment 1

Figure 1:
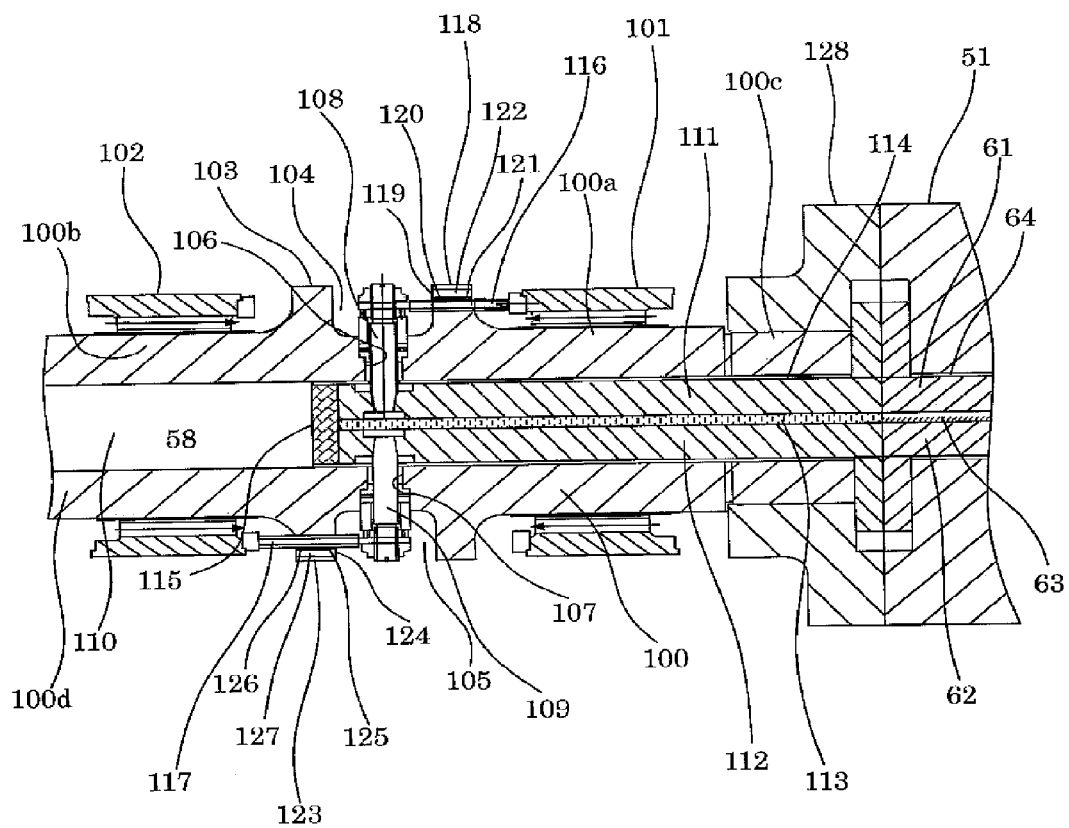
FIG. 1 is a side sectional view showing a slip ring device and a rotary electric machine using the same according to Embodiment 1 of the present invention.
Figure 2:
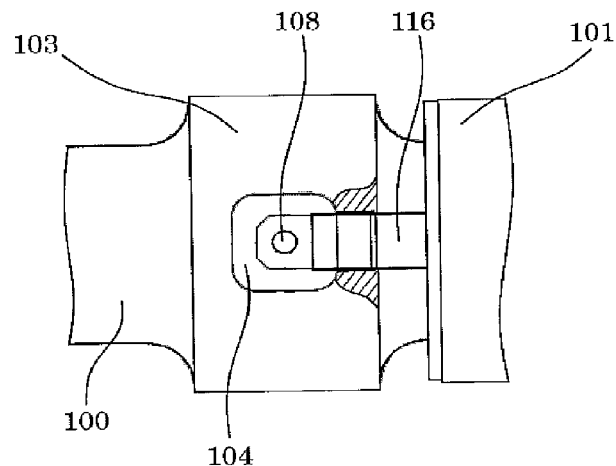
FIG. 2 is a relevant part plan view showing the slip ring device according to Embodiment 1 of the present invention.
Figure 3:
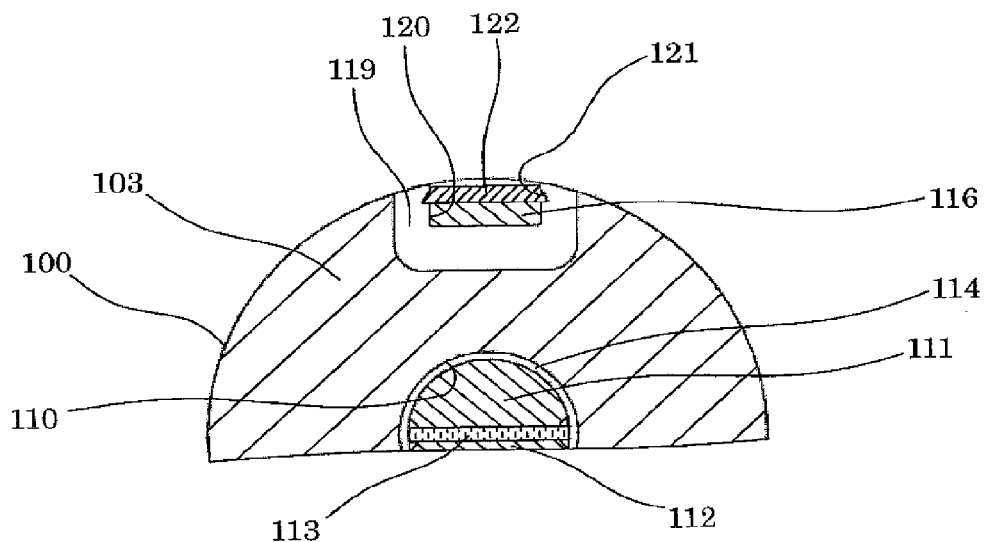
FIG. 3 is a relevant part sectional view showing the slip ring device according to Embodiment 1 of the present invention.
Figure 4:
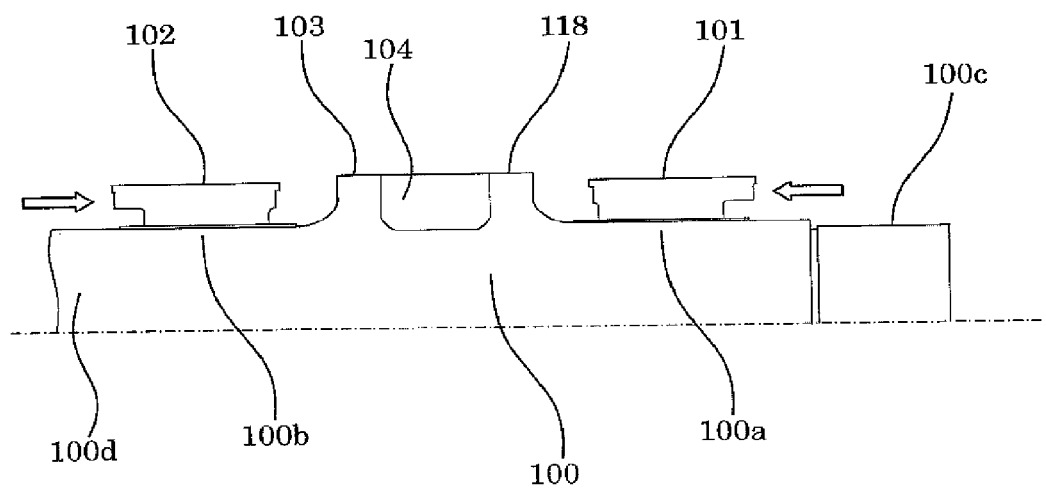
FIG. 4 is a sectional view showing shrink-fitting means for slip rings in the slip ring device according to Embodiment 1 of the present invention.

Hereinafter, Embodiment 1 of the present invention will be described with reference to FIG. 1 to FIG. 4. FIG. 1 is a side sectional view showing a slip ring device and a rotary electric machine using the same according to Embodiment 1 of the present invention. FIG. 2 is a relevant part plan view showing the slip ring device according to Embodiment 1 of the present invention. FIG. 3 is a relevant part sectional view showing the slip ring device according to Embodiment 1 of the present invention. FIG. 4 is a sectional view showing shrink-fitting means for slip rings in the slip ring device according to Embodiment 1 of the present invention.

In these respective drawings, a reference numeral 100 denotes a slip ring shaft which is provided separately from a rotor shaft 51 at a position on the outside of the machine, the position having a relatively large shaft diameter such as the position of an oil thrower or the like of a bearing (not shown in the drawing) of the rotor shaft 51. 100*a* denotes a first slip ring attaching portion of the slip ring shaft 100, 100*b* denotes a second slip ring attaching portion of the slip ring shaft 100, 100*c* denotes a shaft end portion on the rotor shaft 51 side of the slip ring shaft 100, and 100*d* denotes a shaft end portion on the side opposite to the rotor shaft 51 of the slip ring shaft 100. Incidentally, the shaft diameter of the shaft end portion 100*c* on the rotor shaft 51 side of the slip ring shaft 100 is a shaft diameter smaller than the shaft diameter of the first slip ring attaching portion 100*a* of the slip ring shaft 100.

101 denotes a first slip ring which is put from a shaft end portion 100*c* on the rotor shaft 51 side of the slip ring shaft 100 and is attached by shrink-fitting to the first slip ring attaching portion 100*a* of the slip ring shaft 100, and 102 denotes a second slip ring which is attached by shrink-fitting to the second slip ring attaching portion 100*b* of the slip ring shaft 100.

103 denotes a lead connecting portion which is located in the slip ring shaft 100 between the first slip ring attaching portion 100*a* and the second slip ring attaching portion 100*b* of the slip ring shaft 100 and is formed larger in shaft diameter than the shaft diameters of the first slip ring attaching portion 100*a* and the second slip ring attaching portion 100*b* of the slip ring shaft 100. The outer diameter of the lead connecting portion 103 is, for example, an outer diameter slightly larger than the outer diameters of the first slip ring 101 and the second slip ring 102.

104 denotes a first lead connecting concave portion on the positive pole side, formed in the lead connecting portion 103; and 105 denotes a second lead connecting concave portion on the negative pole side, formed in the lead connecting portion 103.

106 denotes a first radial lead placing hole formed in the first lead connecting concave portion 104 of the lead connecting portion 103, and 107 denotes a second radial lead placing hole formed in the second lead connecting concave portion 105 of the lead connecting portion 103.

108 denotes a first radial lead to be placed in the first radial lead placing hole 106, and 109 denotes a second radial lead to be placed in the second radial lead placing hole 107.

110 denotes a hollow hole formed in a central portion of the slip ring shaft 100. 111 and 112 denote a crescent shaped first axial lead and a crescent shaped second axial lead, both of which being placed in the hollow hole 110 formed in the central portion of the slip ring shaft 100, the first axial lead 111 being to be connected to the first radial lead 108 and the second axial lead 112 being to be connected to the second radial lead 109. The first axial lead 111 and the second axial lead 112 are connected to a first axial lead 61 and to a second axial lead 62 in the rotor shaft 51.

Then, an insulator between leads 113 is inserted between the first axial lead 111 and the second axial lead 112; and an insulator 114 is inserted between the hollow hole 110 and the first axial lead 111 and between the hollow hole 110 and the second axial lead 112. An insulator 115 is provided at end portions of the first axial lead 111 and the second axial lead 112.

116 denotes a first slip ring lead which is connected to the first slip ring 101 and to the first radial lead 108, and 117 denotes a second slip ring lead which is connected to the second slip ring 102 and to the second radial lead 109.

A first lead communicating concave portion 119 brought into communication with the first lead connecting concave portion 104 of the lead connecting portion 103 is formed in a first slip ring lead supporting portion 118 which supports the first slip ring lead 116. A lead groove 120 is formed in the first lead communicating concave portion 119 in the lead connecting portion 103 and the first slip ring lead 116 passes through the lead groove 120. The lead groove 120 portion is formed with a wedge groove 121 and the first slip ring lead 116 is firmly fixed to the first slip ring lead supporting portion 118 by a wedge 122 attached by insertion in the wedge groove 121.

Furthermore, a second lead communicating concave portion 124 brought into communication with the second lead connecting concave portion 105 of the lead connecting portion 103 is formed in a second slip ring lead supporting portion 123 which supports the second slip ring lead 117. A lead groove 125 is formed in the second lead communicating concave portion 124 in the lead connecting portion 103 and the second slip ring lead 117 passes through the lead groove 125. The lead groove 125 portion is formed with a wedge groove 126 and the second slip ring lead 117 is firmly fixed to the second slip ring lead supporting portion 123 by a wedge 127 attached by insertion in the wedge groove 126.

128 denotes a coupling which is for attaching the slip ring shaft 100 to the rotor shaft 51 and is to be attached by shrink-fitting to the shaft end portion 100c on the rotor shaft 51 side of the slip ring shaft 100 after the first slip ring 101 is attached by shrink-fitting, and the coupling 128 is formed smaller in shaft diameter than the shaft diameter of the shaft end portion 100c on the rotor shaft 51 side of the slip ring shaft 100.

In the slip ring device which is configured such that the coupling 128 is attached by shrink-fitting to the shaft end portion 100c on the rotor shaft 51 of the slip ring shaft 100 side, the coupling 128 and the rotor shaft 51 are integrally joined by a bolt joint, a joint using together bolts and reamer pins, a weld joint or the like to constitute as the rotary electric machine.

Figure 5:
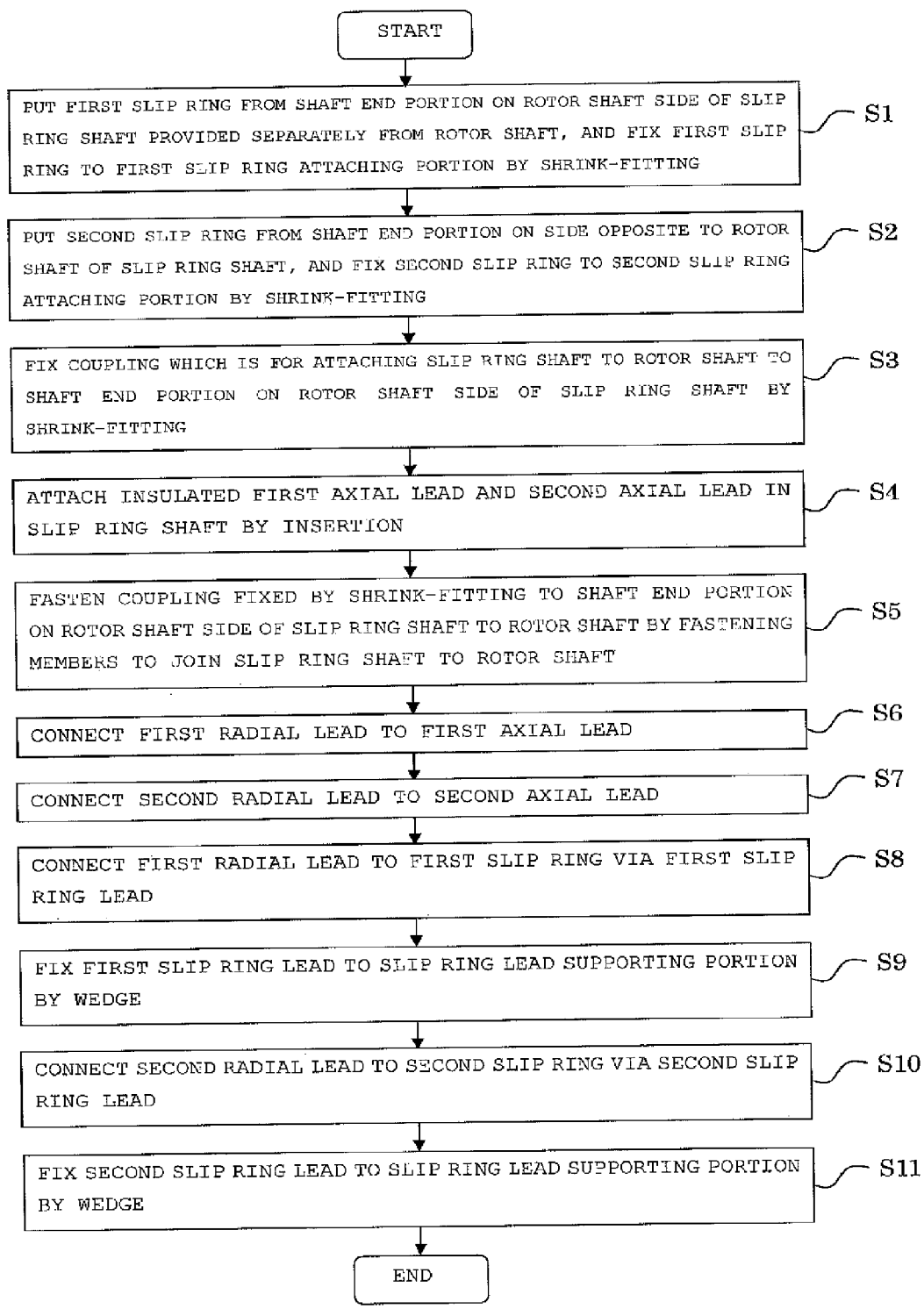
FIG. 5 is a flow chart showing a manufacturing process of the slip ring device and the rotary electric machine using the same according to Embodiment 1 of the present invention.

Next, an example of a manufacturing process as the slip ring device and a joining process of the coupling 128 and the rotor shaft 51 will be described with reference to a flow chart shown in FIG. 5.

First, as shown in FIG. 4, the first slip ring 101 is put from the shaft end portion 100c on the rotor shaft 51 side of the slip ring shaft 100 which is provided separately from the rotor shaft 51, and the first slip ring 101 is attached by shrink-fitting and fixed to the first slip ring attaching portion 100a of the slip ring shaft 100. (Step S1)

The second slip ring 102 is put from the shaft end portion 100d on the side opposite to the rotor shaft 51 of the slip ring shaft 100 and is attached by shrink-fitting and fixed to the second slip ring attaching portion 100b of the slip ring shaft 100. (Step S2)

Next, the coupling 128 which is for attaching the slip ring shaft 100 to the rotor shaft 51 is attached by shrink-fitting and fixed to the shaft end portion 100c on the rotor shaft 51 side of the slip ring shaft 100 after the first slip ring 101 is attached by shrink-fitting to the shaft end portion 100c on the rotor shaft 51 side of the slip ring shaft 100. (Step S3)

The first axial lead 111 and the second axial lead 112, both of which being insulated by the insulator between leads 113 and the insulator 114, are attached by insertion in the hollow hole 110 of the slip ring shaft 100. (Step S4)

Next, the coupling 128 attached by shrink-fitting and fixed to the shaft end portion 100c on the rotor shaft 51 side of the slip ring shaft 100 is fastened to the rotor shaft 51 by fastening members to join the slip ring shaft 100 to the rotor shaft 51. (Step S5)

Then, the first radial lead 108 is connected to the first axial lead 111 and the second radial lead 109 is connected to the second axial lead 112. (Steps S6, S7)

The first slip ring 101 is connected to the first radial lead 108 via the first slip ring lead 116. (Step S8)

The first slip ring lead 116 is fixed to the first slip ring lead supporting portion 118 by the wedge 122. (Step S9)

The second slip ring 102 is connected to the second radial lead 109 via the second slip ring lead 117. (Step S10)

The second slip ring lead 117 is fixed to the first slip ring lead supporting portion 123 by the wedge 127. (Step S11)

In this way, the slip ring device is manufactured and the slip ring device is integrally configured with the rotary electric machine by joining of the coupling 128 and the rotor shaft 51.

Figure 6:
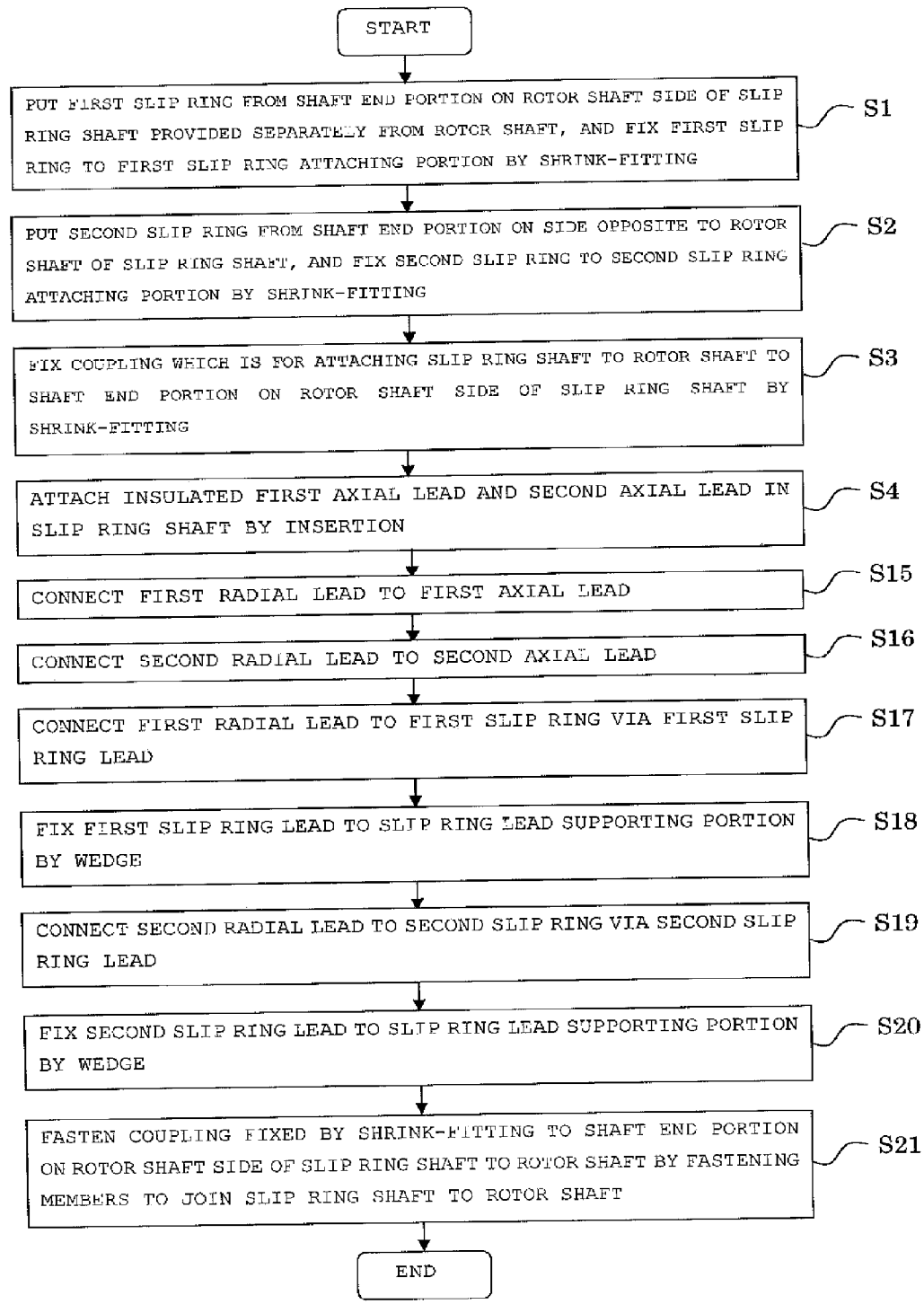
FIG. 6 is a flow chart showing other manufacturing process of the slip ring device and the rotary electric machine using the same according to Embodiment 1 of the present invention.

Furthermore, other example of a manufacturing process as the slip ring device and a joining process of the coupling 128 and the rotor shaft 51 will be described with reference to a flow chart shown in FIG. 6.

First, as shown in FIG. 4, the first slip ring 101 is put from the shaft end portion 100c on the rotor shaft 51 side of the slip ring shaft 100 which is provided separately from the rotor shaft 51, and the first slip ring 101 is attached by shrink-fitting and fixed to the first slip ring attaching portion 100a of the slip ring shaft 100. (Step S1)

The second slip ring 102 is put from the shaft end portion 100d on the side opposite to the rotor shaft 51 of the slip ring shaft 100 and is attached by shrink-fitting and fixed to the second slip ring attaching portion 100b of the slip ring shaft 100. (Step S2)

Next, the coupling 128 which is for attaching the slip ring shaft 100 to the rotor shaft 51 is attached by shrink-fitting and fixed to the shaft end portion 100c on the rotor shaft 51 side of the slip ring shaft 100 after the first slip ring 101 is attached by shrink-fitting to the shaft end portion 100c on the rotor shaft 51 side of the slip ring shaft 100. (Step S3)

The first axial lead 111 and the second axial lead 112, both of which being insulated by the insulator between leads 113 and the insulator 114, are attached by insertion in the hollow hole 110 of the slip ring shaft 100. (Step S4)

Next, the first radial lead 108 is connected to the first axial lead 111 and the second radial lead 109 is connected to the second axial lead 112. (Steps S15, S16)

The first slip ring 101 is connected to the first radial lead 108 via the first slip ring lead 116. (Step S17)

The first slip ring lead 116 is fixed to the first slip ring lead supporting portion 118 by the wedge 122. (Step S18)

The second slip ring 102 is connected to the second radial lead 109 via the second slip ring lead 117. (Step S19)

The second slip ring lead 117 is fixed to the first slip ring lead supporting portion 123 by the wedge 127. (Step S20)

Next, the coupling 128 attached by shrink-fitting and fixed to the shaft end portion 100c on the rotor shaft 51 side of the slip ring shaft 100 is fastened to the rotor shaft 51 by fastening members to join the slip ring shaft 100 to the rotor shaft 51. (Step S21)

In this way, in a completed state as the slip ring device, the slip ring device is integrally configured with the rotary electric machine by joining of the coupling 128 and the rotor shaft 51. In this case, there is a merit in that the slip ring device can be manufactured as a single body separately from the manufacture of the rotor.

As described above, two manufacturing processes have been described as examples; however, it will be understood that the present invention is not limited thereto, and the flow of the respective steps of the respective manufacturing processes may be slightly shifted if the structure as shown in FIG. 1 can be eventually provided.

By the way, an example of joining of the rotor shaft 51 and the coupling 128 attached by shrink-fitting and fixed to the shaft end portion 100c on the rotor shaft 51 side of the slip ring shaft 100 will be described.

Figure 7:
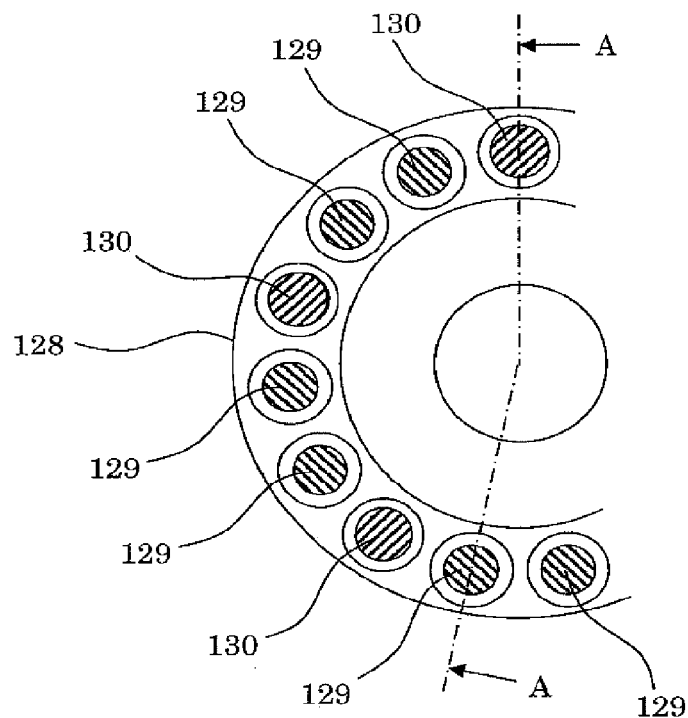
FIG. 7 is a sectional view showing joining means in the slip ring device and the rotary electric machine using the same according to Embodiment 1 of the present invention.
Figure 8:
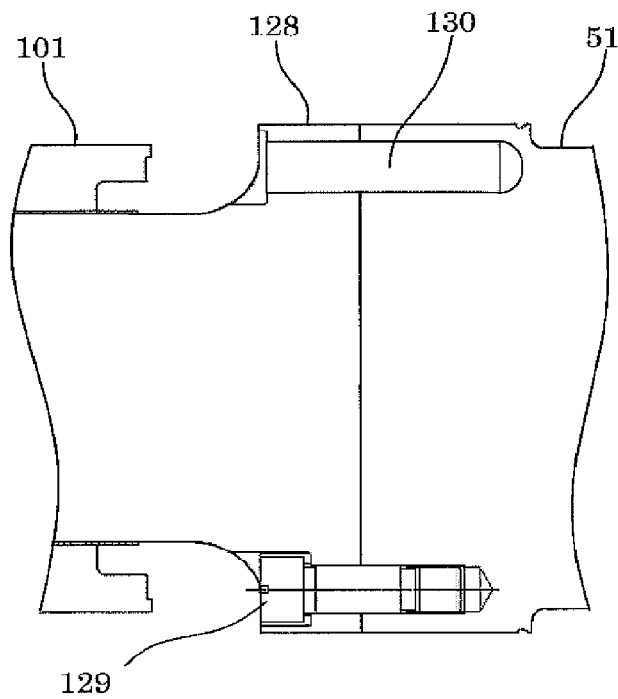
FIG. 8 is a sectional view taken along the line A-A in FIG. 7 and showing the slip ring device and the rotary electric machine using the same according to Embodiment 1 of the present invention.

For example, as exemplarily shown in FIG. 7 and FIG. 8, the joining of the coupling 128 and the rotor shaft 51 is performed by fastening with bolts 129 and reamer pins 130. As shown in FIG. 7, there is shown an example in which one reamer pin 130 is disposed at the space between two arranged bolts 129.

The coupling 128 and the rotor shaft 51 are firmly fastened and joined by the bolts 129, and the reamer pins 130 are attached by insertion by, for example, cooling-fitting at the same radial positions as the bolts 129. Incidentally, the positions of the reamer pins 130 may be provided at different radial positions from the bolts 129. Furthermore, the reamer pin 130 can be substituted by being strongly knocked or by heating the shaft side in place of cooling-fitting.

As described above, high load torque can be transmitted between the coupling 128 and the rotor shaft 51 by the shearing force of the reamer pin 130 in addition of the frictional force of the bolt 129.

Figure 9:
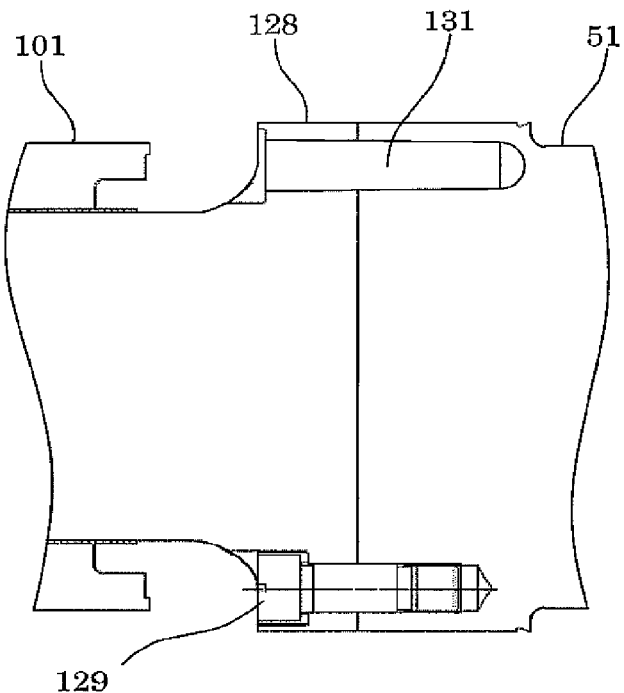
FIG. 9 is a sectional view showing other joining means in the slip ring device and the rotary electric machine using the same according to Embodiment 1 of the present invention.

Furthermore, as exemplarily shown in FIG. 9, a tapered reamer pin 131 is provided in place of the reamer pin 130 having a straight shape. In the case of the straight-shaped reamer pin 130, the whole length of a reamer portion serves as a fit portion; and therefore, workability is not good in a small space. The tapered reamer pin 131 is provided; and accordingly, insertion length for cooling-fitting is short and workability is improved.

Figure 10:
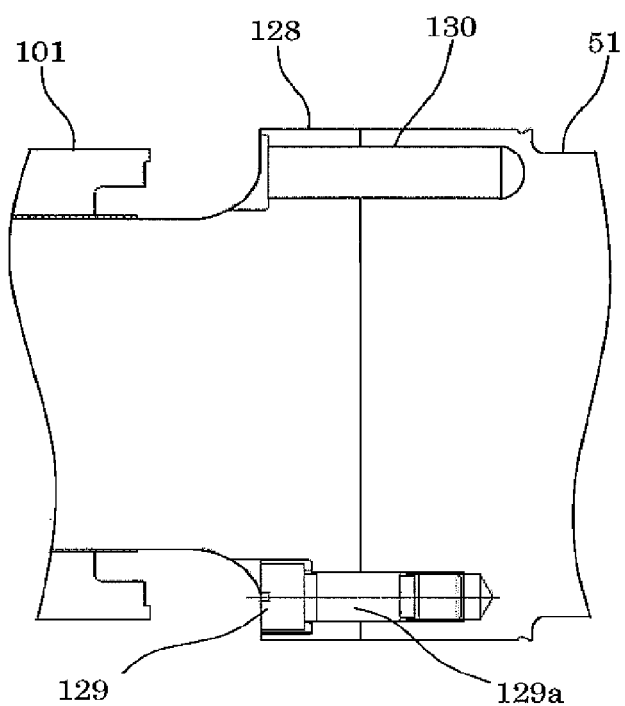
FIG. 10 is a sectional view showing other joining means in the slip ring device and the rotary electric machine using the same according to Embodiment 1 of the present invention.
Figure 11:
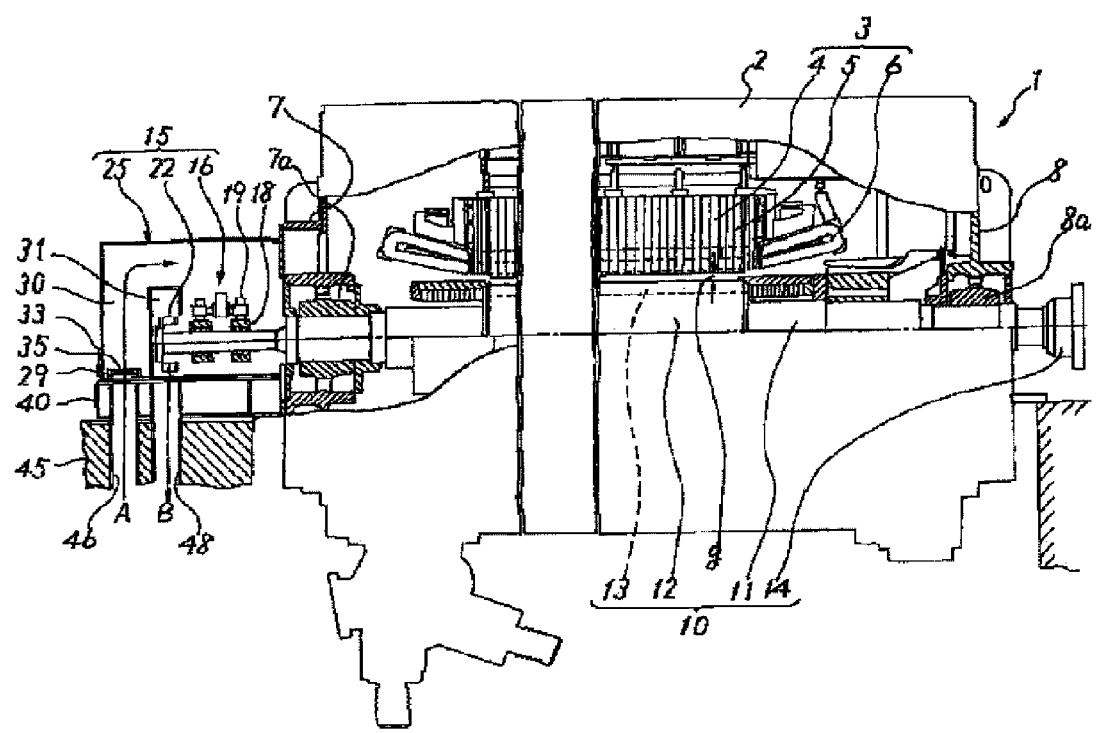
FIG. 11 is a side sectional view showing a rotary electric machine in which a conventional slip ring structure is used.
Figure 12:
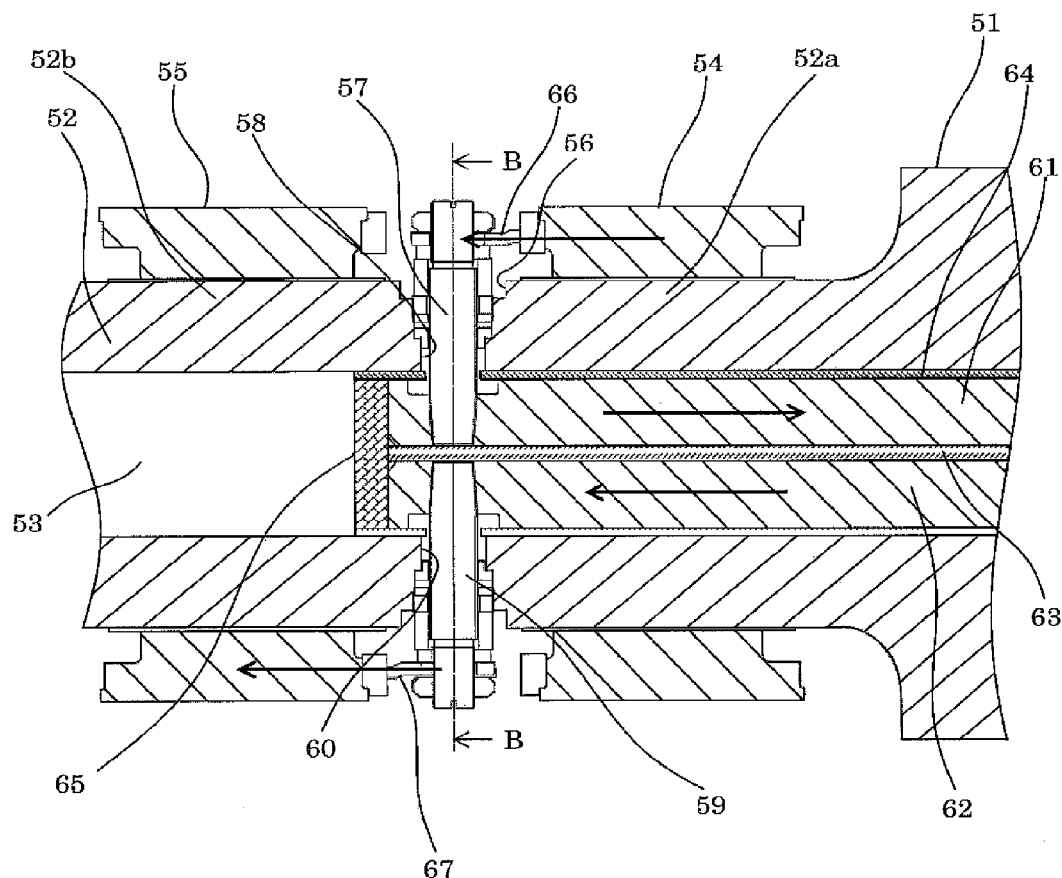
FIG. 12 is a relevant part sectional view showing the rotary electric machine in which the conventional slip ring structure is used.
Figure 13:
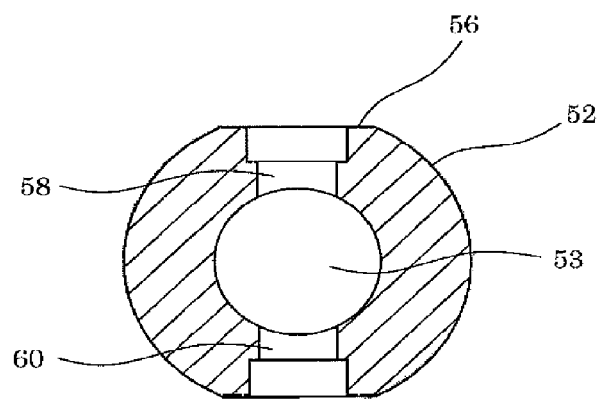
FIG. 13 is a sectional view taken along the line B-B in FIG. 12 and showing the rotary electric machine in which the conventional slip ring structure is used.
Figure 14:
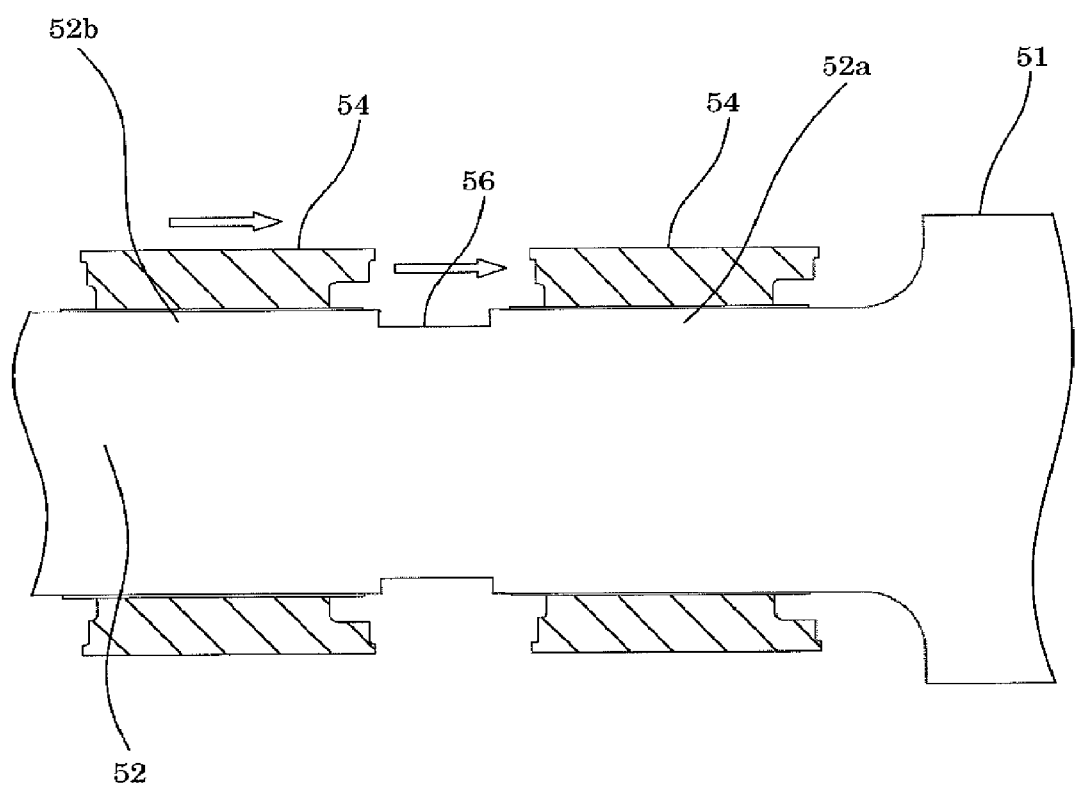
FIG. 14 is a sectional view showing shrink-fitting means for slip rings in the rotary electric machine in which the conventional slip ring structure is used.

Furthermore, as exemplarily shown in FIG. 10, a bolt 129 is formed with a reamer portion 129a. A design is made such that the reamer portion 129a of the bolt 129 passes through the interface between the coupling 128 and the rotor shaft 51. The bolt 129 formed with the reamer portion 129a is designed with a clearance in which tolerance is controlled and is clamped by clamping. Alternatively, a design may be designed such that the reamer portion 129a is made to an interference fit tolerance, the bolt 129 formed with the reamer portion 129a is fastened in a state where the bolt 129 is cooled, and the reamer portion 129a is fit when returned to ordinary temperature.

In the case where the bolt 129 formed with the reamer portion 129a that is designed with clearance tolerance is used, when the reamer pin 130 is temporarily deformed by torque or the like during a sudden short-circuit, the reamer pin 130 is prevented from deforming largely by the shearing force of the reamer portion 129a of the bolt 129.

In the case where the reamer portion 129a of the bolt 129 is used as interference fit, high torsional torque can be transmitted by the shearing force of the reamer portion 129a.

Incidentally, the joining of the coupling 128 and the rotor shaft 51 is not limited to the aforementioned joining means; but, it will be understood that the joining thereof may be made by similar configuration or may be made by other joining means.

Furthermore, Ni—Cr—Mo—Va steel is used for the rotor shaft 51. Consequently, material having higher strength than the material of the rotor shaft 51 is used as material of the slip ring shaft 100. For example, the slip ring shaft 100 is made of material in which the content of chemical composition such as Ni is larger than that of the rotor shaft 51; and accordingly, the material strength of the slip ring shaft 100 can be higher than that of the rotor shaft 51.

The material having higher strength than that of the rotor shaft 51 is used for the slip ring shaft 100 to which high stress is loaded; and accordingly, more reasonable design can be achieved.

By the way, centrifugal force is loaded during operation of the rotary electric machine; and therefore, when the supporting length of the first slip ring lead 116 and the second slip ring lead 117 are long, stress generated in the first slip ring lead 116 and the second slip ring lead 117 increases.

The first slip ring lead 116 is fixed to the first slip ring lead supporting portion 118 by the wedge 122 and the second slip ring lead 117 is fixed to the second slip ring lead supporting portion 123 by the wedge 127; and accordingly, each supporting length of the first slip ring lead 116 and the second slip ring lead 117 is shortened and thus the stress generated in the first slip ring lead 116 and the second slip ring lead 117 can be reduced.

INDUSTRIAL APPLICABILITY

The present invention is suitable for achieving a slip ring device and a rotary electric machine using the same, both of which can achieve that time of shrink-fitting work is shortened and strength is improved.

The invention claimed is:
1. A slip ring device comprising:
a slip ring shaft provided separately from a rotor shaft;
a first slip ring and a second slip ring, both of which being put from both ends of said slip ring shaft, respectively, said first slip ring being attached by shrink-fitting to a first slip ring attaching portion of said slip ring shaft, and said second slip ring being attached by shrink-fitting to a second slip ring attaching portion of said slip ring shaft;
a lead connecting portion which is located between the first slip ring attaching portion and the second slip ring attaching portion in said slip ring shaft and is formed to be a shaft diameter larger than the shaft diameters of the first slip ring attaching portion and the second slip ring attaching portion of said slip ring shaft;
a first radial lead and a second radial lead, said first radial lead being placed in a first radial lead placing hole and said second radial lead being placed in a second radial lead placing hole, said radial lead placing holes being formed in the lead connecting portion;
a first axial lead and a second axial lead, both of which being placed in a hollow hole formed in a central portion of said slip ring shaft, said first axial lead being connected to said first radial lead and said second axial lead being connected to said second radial lead;
a first slip ring lead which is connected to said first slip ring and to said first radial lead;
a second slip ring lead which is connected to said second slip ring and to said second radial lead; and
a coupling which is attached by shrink-fitting to a shaft end portion on the rotor shaft side of said slip ring shaft after said first slip ring is attached by shrink-fitting.

2. The slip ring device according to claim 1,
wherein each of said first slip ring lead and said second slip ring lead passes through a corresponding lead groove formed in the lead connecting portion and is fixed by a corresponding wedge attached by insertion in a corresponding wedge groove formed in the lead groove portion.

3. The slip ring device according to claim 1,
wherein said slip ring shaft is made of material having higher strength than material of said rotor shaft.

4. A rotary electric machine using the slip ring device as set forth in claim 1.

5. The slip ring device according to claim 2,
wherein said slip ring shaft is made of material having higher strength than material of said rotor shaft.

6. A rotary electric machine using the slip ring device as set forth in claim 2.

7. A rotary electric machine using the slip ring device as set forth in claim 3.

8. A rotary electric machine using the slip ring device as set forth in claim 5.

\* \* \* \* \*